Figure 1:
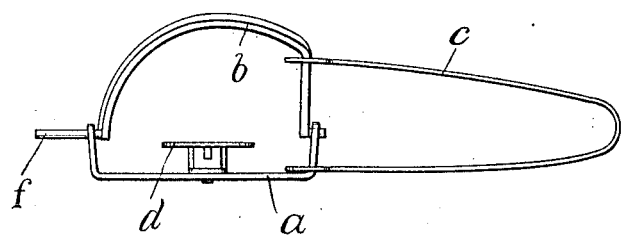

M. F. RICHARDSON.
SPRING TRAP.
APPLICATION FILED DEC. 6, 1911.

1,048,586.

Patented Dec. 31, 1912.

WITNESSES
M. D. Shuckerow
Louis Lucia

INVENTOR
Maurice F. Richardson
BY
N. E. Hart
ATTORNEY

UNITED STATES PATENT OFFICE.

MAURICE F. RICHARDSON, OF SOUTHINGTON, CONNECTICUT.

SPRING-TRAP.

1,048,586.  Specification of Letters Patent.  Patented Dec. 31, 1912.

Application filed December 6, 1911. Serial No. 664,148.

*To all whom it may concern:*

Be it known that I, MAURICE F. RICHARDSON, a citizen of the United States, and a resident of Southington, in the county of Hartford and State of Connecticut, have invented certain new and useful Improvements in Spring-Traps, of which the following is a specification.

The object of the invention is to provide a simple and convenient means for setting the trap, and particularly for operating the spring without requiring the use of the hands for this purpose.

The invention is illustrated in the drawings in which—

Figure 2:
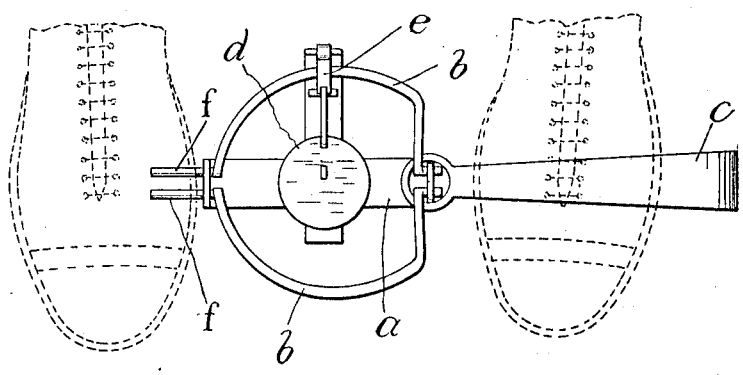

Figure 1 is a side elevation of the trap. Fig. 2 is a plan view thereof showing the manner of operation.

In the drawings $a$ denotes the base of the trap, $b$ $b$ the jaws and $c$ the operating spring, one end of which, as it will be observed, is adapted to embrace the jaws to close them. When the spring is compressed the trap is locked open in the ordinary way by the pan $d$ engaging the latch $e$ which lies over one of the jaws.

The setting of a trap of this character must be done very carefully in order to avoid getting the fingers caught in the jaws, and by my invention I have provided a means whereby the trap can be held in position and the spring pressed down to operative position by the feet, leaving the hands free to manipulate the pan and latch for the setting of the trap. These traps are usually used by persons who make a business of trapping wild animals and their greatest use comes in the winter and in the colder climates where the handling of the traps is a very unpleasant and inconvenient matter.

My improvements consist in providing extensions $f$ $f$ at the ends of the pivot pins by which the jaws are connected to the base of the trap, these projections forming a foot piece at one side of the trap and the spring forming the foot piece at the other side of the trap, thus providing a convenient means for operating the trap as clearly illustrated in Fig. 2 of the drawings, and removing any liability of injury to the hands or fingers of the users.

I claim as my invention:

1. In a trap, a base, jaws pivotally secured thereto, a pan and latch to hold the jaws in open position, an operating spring embracing the jaws at one side, and lateral foot engaging extensions at the opposite side of and formed integrally with the jaws as and for the purpose specified.

2. In a trap, a base, jaws, laterally arranged pivots formed integrally with the jaws and adapted to enter bearings in said base, a pan and latch, an operating spring embracing the jaws at one side and lateral foot engaging extensions to the pivot pins at the opposite side of the jaws extending for a substantial distance outside of said base.

MAURICE F. RICHARDSON.

Witnesses:
  L. E. TICHTHOON,
  R. G. ANDREWS.

Copies of this patent may be obtained for five cents each, by addressing the "Commissioner of Patents, Washington, D. C."